H. B. JOHNSTON.
DRUM SCREEN FOR FISHWAYS.
APPLICATION FILED JULY 11, 1912.
1,064,335.
Patented June 10, 1913.
2 SHEETS—SHEET 1.
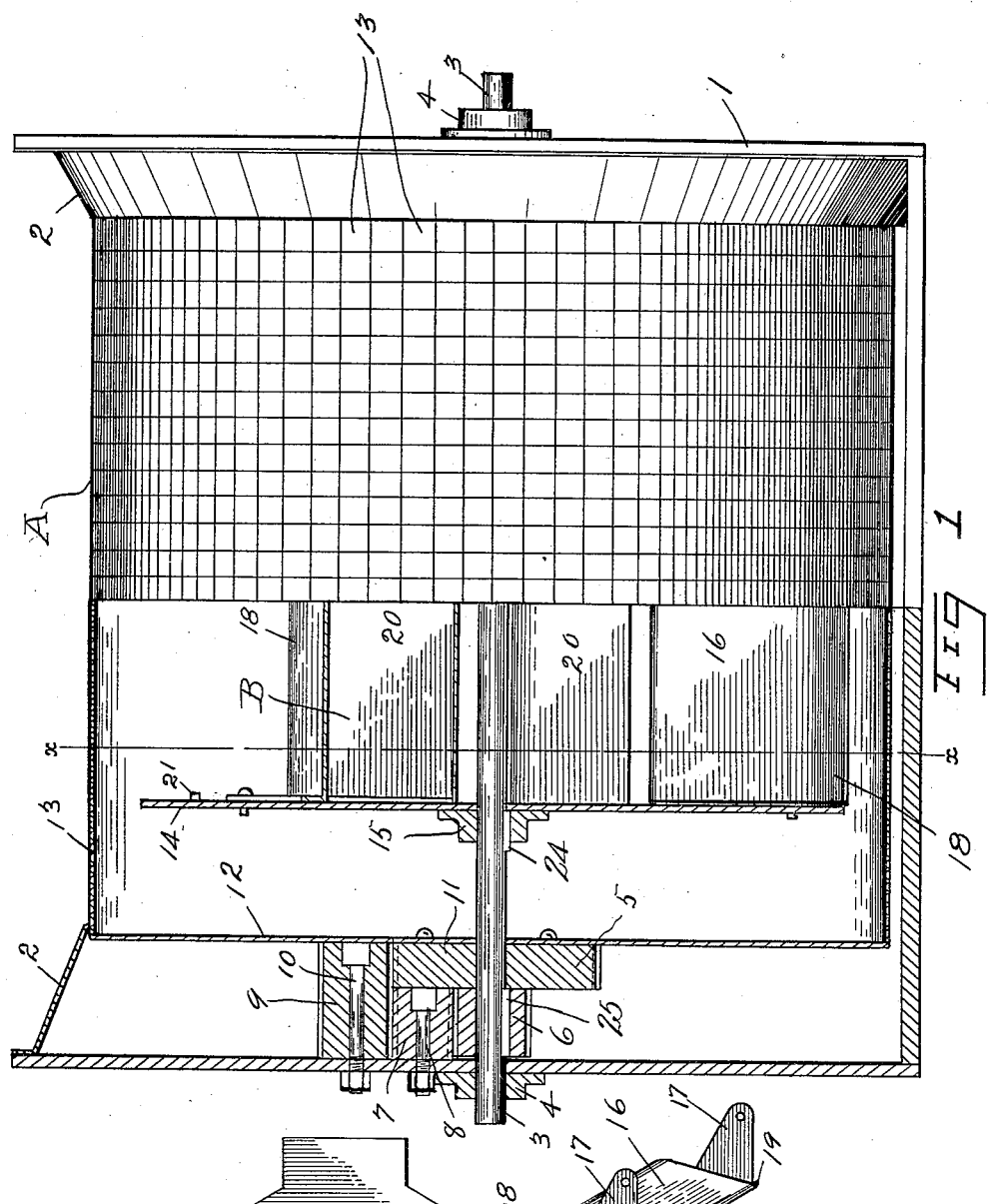

H. B. JOHNSTON.
DRUM SCREEN FOR FISHWAYS.
APPLICATION FILED JULY 11, 1912.
1,064,335.
Patented June 10, 1913.
2 SHEETS—SHEET 2.
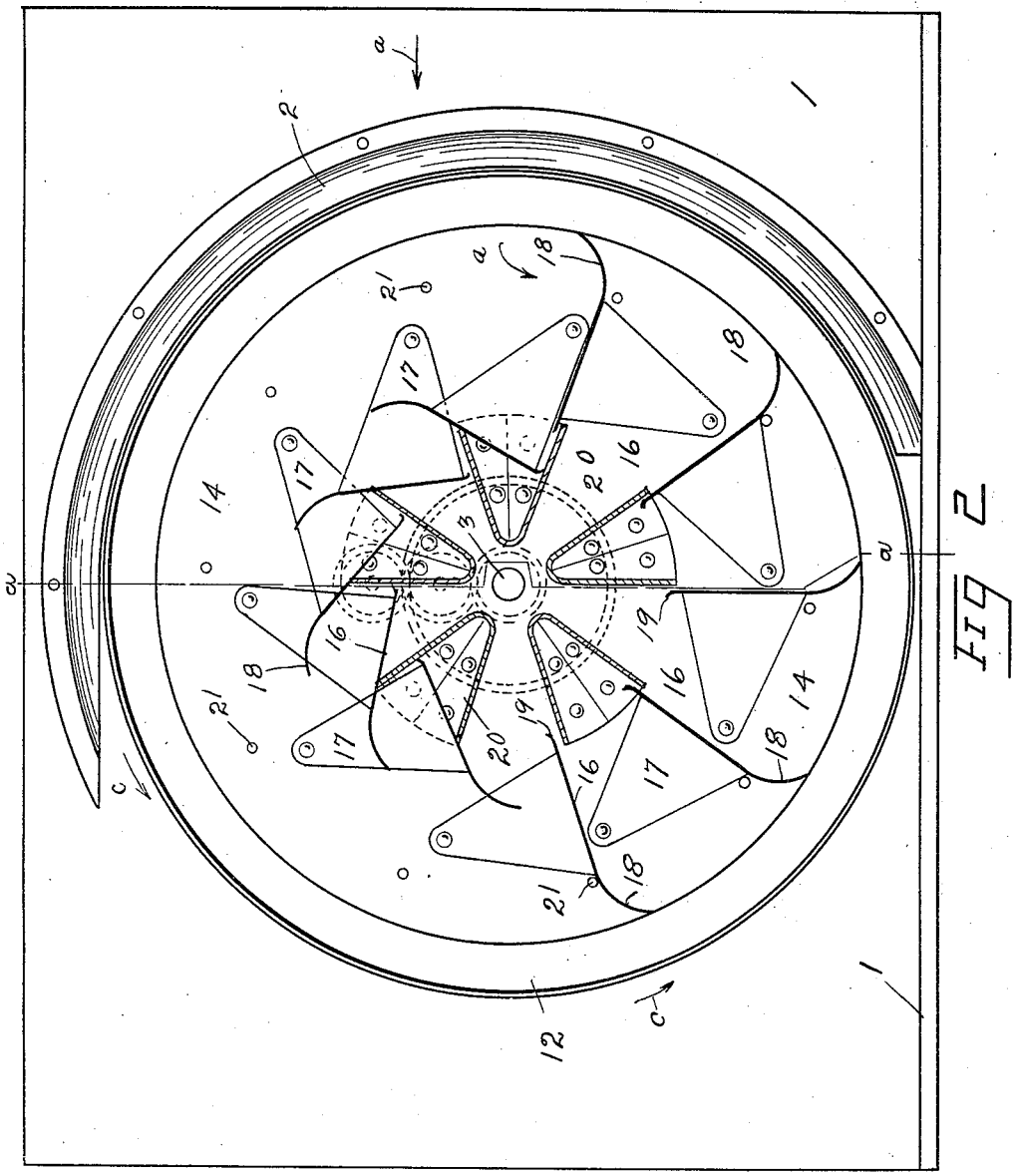

UNITED STATES PATENT OFFICE.

HARRY B. JOHNSTON, OF SALT LAKE CITY, UTAH, ASSIGNOR TO M. B. JOHNSTON, OF SALT LAKE CITY, UTAH.

DRUM-SCREEN FOR FISHWAYS.

1,064,335.

Specification of Letters Patent. Patented June 10, 1913.

Application filed July 11, 1912. Serial No. 708,909.

*To all whom it may concern:*

Be it known that I, HARRY B. JOHNSTON, a citizen of the United States, residing at Salt Lake City, in the county of Salt Lake and State of Utah, have invented certain new and useful Improvements in Drum-Screens for Fishways, of which the following is a specification.

My invention relates to fish screens and has for its object to provide a fish screen strong and economical in construction, efficient in operation and by the use of which the fish in a stream may be kept from passing up or down the stream, and one that will not become clogged by the moss, leaves or other debris in the water.

These objects I accomplish with the device illustrated in the accompanying drawings in which similar letters of reference indicate like parts throughout the several figures and as described in the specifications forming a part of this application, and as pointed out in the appended claims.

Figure 1 is an elevation, parts shown in section on line *a a* of Fig. 2. Fig. 2 is a transverse sectional elevation on line *x x* of Fig. 1. Fig. 3 is a plan view of a sheet of metal cut to form one of the dropping blades before it is bent into form. Fig. 4 is a view in perspective of one of said blades after it is bent into form.

My device is mounted in a casing 1 made of metal or concrete, within which is integrally formed the inwardly extended flanges 2. A shaft 3 is horizontally mounted in the bearings 4 within said casing 1. Carried on said shaft 3 is a drum screen A. Within said drum screen and carried on said shaft 3 is the power wheel B. Secured on said shaft 3 by means of a key 25 is the pinion 6, the teeth of which mesh with the teeth of an idler gear 7. Said idler gear 7 is mounted on a stud shaft 8 which is fastened in said casing 1. The teeth of said idler gear also mesh with the teeth of another gear wheel 9, which is carried on a stud shaft 10 and also fastened on said casing. The teeth of said gear wheel 9 also mesh with the teeth of a gear wheel 11, which is carried on said shaft 3 as an axis. Carried on said shaft are two circular disks 12 to which disks the said gear wheels 11 are securely fastened. Secured on the peripheral edges of said disks 12 is the screen 13. The power wheel B consists of two circular disks 14 rigidly fastened to the hubs 15, which hubs are keyed on the said shaft 3 by keys 24 and turn therewith. Between the said disks 14 are mounted the drop blades 16, which are cut from sheet metal in the form shown in Fig. 3, and are bent into the form shown in Fig. 4. Each of said blades 16 has bracket lugs 17 integrally formed thereon and also has one edge or side 18 curved in one direction and the opposed side 19 curved in the opposite direction. Said blades are pivoted to said disks by rivets through the ends of the bracket lugs 17 and said disks 14. Between said disks 14 is rigidly fastened the cups 20, having their sides radially disposed and their ends riveted to said disks. In the operation of my device and with the flow of the water as shown by the arrows *a* in Fig. 2, the blades 16 will impede the said flow below the shaft 3 on the ingress or up stream side. Said blades will fall by gravity on the down stream side and a portion enter the cups 20. The force of the water against the curved portion 18 of each blade as the blades are carried to the upper portion of the wheel will aid in causing them to fall into the said cups 20. This will leave the flow of the water through the upper portion of the said power wheel unobstructed, and by impeding the flow of the water with each cup and its adjacent blades throughout the greater portion of said wheel will develop power in the shaft 3, which power will be imparted through the pinion 6, idler 7, gear 9 and gear wheel 11, to the drum screen A and it will be rotated in the direction of the arrow *c*. Any moss, leaves or debris will be accrued on said screening 13 over the drum screen A and be washed off by the water on the down stream side of my device, and fish will be prevented from passing up or down the stream, with a wheel having a diameter equal to the depth of the water. Stud pins or lugs 21 are secured in said disks 14 and extended laterally therefrom on the inner side of said disks; against which lugs 21 the bracket lugs 17 of said blades 16 strike, to limit the outward movement of said blades.

Having thus described my invention I desire to secure by Letters Patent and claim:

1. In a drum screen for fish ways the combination of a horizontal shaft; a power wheel secured on said shaft and rotating therewith consisting of two circular disks;

cups horizontally secured between said disks; bracket shaped blades having their sides curved in opposed directions from the plane of the blade pivotally swung between said disks and adapted to partially enter said cups on the upper side of said wheel and to swing from out of said cups on the lower side of the wheel; a drum screen concentrically surrounding said power wheel, and mounted on said shaft; and intermeshing gears coacting to impart motion to said shaft in one direction and to said drum screen continuously in the opposite direction.

2. A revolving drum screen for fish ways consisting of a casing; a horizontal shaft mounted in said casing; a pinion thereon; an idler gear mounted on a stud shaft which is secured in said casing, the teeth of said idler gear mesh with the teeth of said pinion; a gear wheel mounted on another stud shaft the teeth of which gear mesh with the teeth of said idler gear; two gears mounted on said horizontal shaft, the teeth of one of which mesh with the teeth of the last mentioned gear; a circular disk secured to each of said last mentioned gears; a screen fastened on the peripheral edge of said disks; and a power wheel secured on said horizontal shaft and within said screen adapted to impart motion to said shaft in one direction and continuously through said gears therefrom to said drum screen in the reverse direction.

3. In a device of the class described the combination of a horizontal shaft; two circular disks mounted thereon; a screen secured on the peripheral edge of said disks; two other circular disks mounted rigidly on said shaft; cups having their ends riveted to said last mentioned disks; movable blades pivoted between said disks a portion of each of which may partially enter one of said cups.

In testimony whereof I have affixed my signature in presence of two witnesses.

HARRY B. JOHNSTON.

Witnesses:
BEN L. CORUM,
CHARLES FALLENTINE.

Copies of this patent may be obtained for five cents each, by addressing the "Commissioner of Patents, Washington, D. C."